United States Patent
Hesse et al.

(10) Patent No.: US 7,462,307 B2
(45) Date of Patent: Dec. 9, 2008

(54) SINGLELAYER AND MULTILAYER POLYOLEFIN FOAM PIPES

(75) Inventors: Achim Hesse, Dresden (DE); Tony Lindstroem, Bleket (SE); Carl-Gustaf Ek, Vaestra Froelunda (SE); Cecilia Rydin, Saevedalen (SE); Allan Boye Hansen, Sandefjord (NO)

(73) Assignee: Borealis GmbH, Schwechat-Mannsworth (AT)

( * ) Notice: Subject to any disclaimer, the term of this patent is extended or adjusted under 35 U.S.C. 154(b) by 494 days.

(21) Appl. No.: 11/329,478

(22) Filed: Jan. 10, 2006

(65) Prior Publication Data

US 2006/0233989 A1    Oct. 19, 2006

Related U.S. Application Data

(62) Division of application No. 10/333,511, filed as application No. PCT/EP01/07914 on Mar. 17, 2003, now Pat. No. 6,986,922.

(51) Int. Cl.
B32B 1/08 (2006.01)
B32B 5/18 (2006.01)
B32B 27/32 (2006.01)
F16L 9/12 (2006.01)
F16L 9/14 (2006.01)

(52) U.S. Cl. .............. 264/45.1; 428/36.5; 428/36.9; 428/36.92; 428/308.4; 428/318.6; 138/140; 138/142; 138/145; 138/149; 264/45.1; 264/165; 264/171.8; 264/171.11; 264/239; 427/135; 427/412.3

(58) Field of Classification Search ............... 428/36.5, 428/36.9, 36.91, 36.92, 308.4, 318.6, 318.8, 428/319.9; 138/140, 142, 145, 149; 525/88; 264/171.1, 171.11, 165, 171.8, 45.1, 219, 264/239; 427/412.3, 135
See application file for complete search history.

(56) References Cited

U.S. PATENT DOCUMENTS 5,985,973 A * 11/1999 Sumitomo et al. .......... 524/451
6,077,907 A * 6/2000 Raetzsch et al. ............ 525/191

* cited by examiner

*Primary Examiner*—Sam Chuan Yao
*Assistant Examiner*—Omar Siddique
(74) *Attorney, Agent, or Firm*—Jordan and Hamburg LLP

(57) ABSTRACT

Process for producing single layer and multilayer polyolefin foam pipes with improved compression resistance having a polyolefin foam layer which consists of mixtures of modified propylene polymers having strain hardening behaviour or propylene homopolymers with a stereospecificity index >98% or propylene copolymers with a stereospecificity index of the homopolymer matrix of >96%. The polyolefin foam pipes include coated steel pipes for transporting crude oil or gas products or district heating applications, single layer pipes for insulation purposes and for non- or low-pressure applications and multilayer plastic pipes for the transportation of hot or cold fluids.

17 Claims, 1 Drawing Sheet

SINGLELAYER AND MULTILAYER POLYOLEFIN FOAM PIPES

The invention relates to singlelayer and multilayer polyolefin foam pipes with improved com-pression resistance from a mixture of propylene polymers as well as to a process for produ-cing them.

Polyolefin foam materials from propylene polymers (U.S. Pat. No. 5,527,573) or from blends of propylene polymers and ethylene copolymers (EP-A-0 291 764) or polyethylene (GB-A-2,099,431) are known. Known modified polypropylenes, which are suitable for the production of extrusion foams are silane grafted propylene polymers (EP-A-0 646 622) or propylene polymers modified by high energy electron radiation (EP-A-0 190 889).

Multilayer plastic tubes, comprising a base tube of propylene polymers (WO 98/43806; WO 97/33116), or steel pipe coatings with a propylene polymer layer (DE-A-198 15 046) are furthermore known.

The disadvantage of these known multilayer plastic pipes is their high coefficient of thermal conductivity. On the other hand, known propylene polymer foam materials have a low com-pression strength being insufficient for certain applications.

It is the object of the present invention to provide single-layer and multilayer polyolefin foam pipes with improved compression strength where at least one layer is comprised of a polyolefin foam layer, which pipes avoid the disadvantages of known products.

According to the present invention, this object is achieved by a polyolefin foam layer, having a density of 50 to 850 kg/m$^3$, which comprises mixtures of A) 5 to 80% by weight of a compound A, which is selected from modified propylene polymers with a melt index of 0.05 to 10 g/10 min at 230° C./2.16 kg, preferably of 0.2 to 10 g/10 min at 230° C./2.16 kg, which modified propylene polymers have strain hardening behaviour, and mixtures of these modified propylene polymers, B) 20 to 95% by weight of a compound B which is selected from propylene homopolymers with a stereospecifity index >98% and a melt index of 0.05 to 10 g/10 min at 230° C./2.16 kg, preferably of 0.1 to 10 g/10 min at 230° C./2.16 kg and copolymers from 80.0 to 99.9% by weight of propylene and 0.1 to 20.0% by weight of ethylene or α-olefins with 4 to 18 carbon atoms with a stereospecificity index of the propylene homopolymer matrix of >96% and a melt index of 0.1 to 10 g/10 min at 230° C./2.16 kg, and mixtures of these propylene homopolymeres and/or copolymers, and, C) optionally, usual amounts of stabilizers and/or processing aids and/or antistats and/or pigments and/or nucleating agents and/or fillers as auxiliary substances.

Pipes, having a polyolefin foam layer according to the present invention show an improved compressive strength compared to conventional foam layer pipes where the foam layer has comparable density, but different composition, either quantitatively and/or qualitatively.

Figure 1:
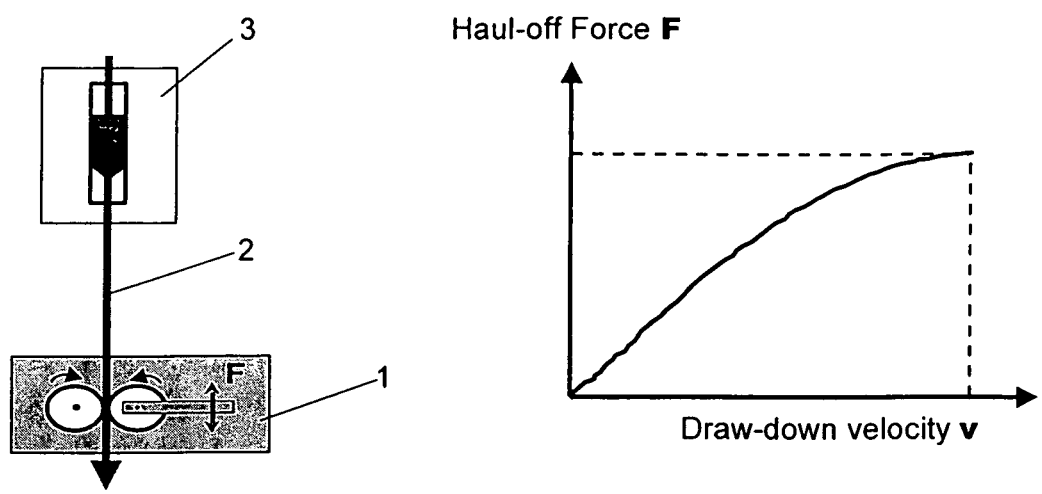
Figure 2:
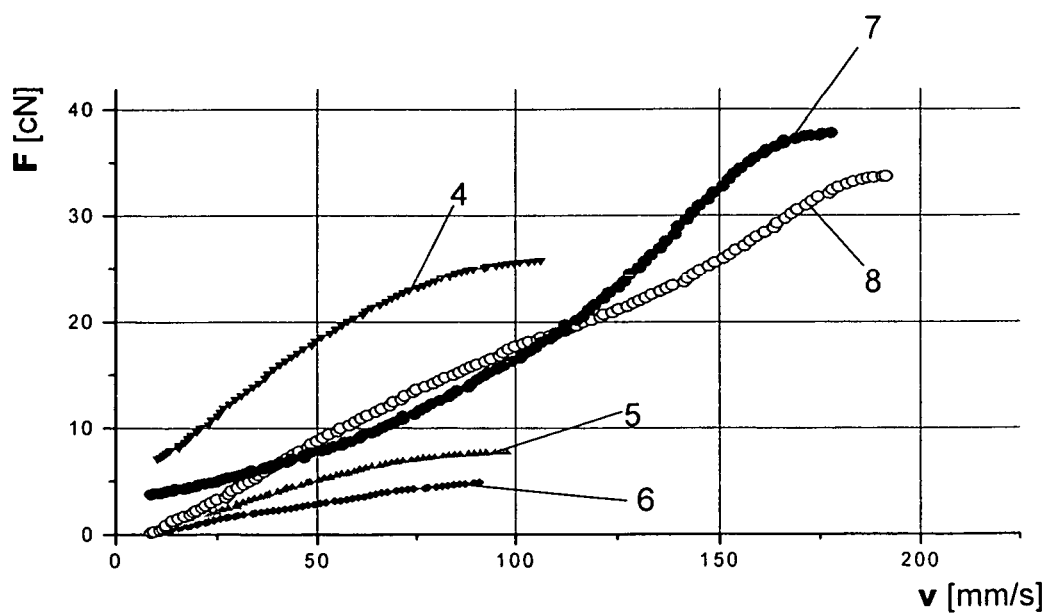

Strain hardening behaviour as used herein is defined according to FIGS. 1 and 2.

FIG. 1 shows a schematic representation of the experimental procedure which is used to determine strain hardening.

The strain hardening behaviour of polymers is analysed by Rheotens apparatus 1 (product of Göttfert, Siemensstr.2, 74711 Buchen, Germany) in which a melt strand 2 is elongated by drawing down with a defined acceleration. The haul-off force F in dependence of draw-down velocity v is recorded.

The test procedure is performed in a standard climatized room with controlled room temperature of T=23° C. The Rheotens apparatus 1 is combined with an extruder/melt pump 3 for continuous feeding of the melt strand 2. The extrusion temperature is 200° C.; a capillary die with a diameter of 2 mm and a length of 6 mm is used and the acceleration of the melt strand 2 drawn down is 120 mm/sec$^2$.

The schematic diagram in FIG. 1 shows in an exemplary fashion the measured increase in haul-off force F (i.e. "melt strength") vs. the increase in draw-down velocity v (i.e. "drawability").

FIG. 2 shows the recorded curves of Rheotens measurements of polymer samples with and without strain hardening behaviour. The maximum points (Fmax; vmax) at failure of the strand are characteristic for the strength and the drawability of the melt.

The standard propylene polymers 4, 5, 6 with melt indices of 0.3, 2.0 and 3.0 g/10 min at 230° C./2.16 kg show a very low melt strength and low drawability. They have no strain hardening.

Modified propylene polymers 7 (melt index of sample in diagram is 2 to 3 g/10 min at 230° C./2.16 kg) or LDPE 8 (melt index of sample in diagram is 0.7 g/10 min at 230° C./2.16 kg) show a completely different drawability vs. melt strength behaviour. With increasing the draw down velocity v the haul-off force F increases to a much higher level, compared to the standard propylene polymers 4, 5, 6. This curve shape is characteristic for strain hardening.

"Modified propylen polymers which have strain hardening behaviour" as used herein have enhanced strength with haul-off forces F>15 cN and enhanced drawability with draw-down velocities v>150 mm/s.

The synthetic resin formed by the polymerization of propylene as the sole monomer is called polypropylene or propylene polymer. While "polypropylene" or "propylene polymer" has been used from time to time in the art to exclude a copolymer of propylene and a minor amount of another monomer, such as ethylene, the term is not so used herein.

Unmodified propylene polymer as used herein comprises propylene homopolymers, copolymers of propylene and ethylene and/or α-olefins with 4 to 18 carbon atoms and mixtures of the aforementioned polymers.

Modified propylene polymers can be produced by any number of processes, e.g. by treatment of the unmodified propylene polymer with thermally decomposing radical-forming agents and/or by treatment with ionizing radiation, where both treatments may optionally be accompanied or followed by a treatment with bi- or multifunctionally unsaturated monomers, e.g. butadiene, isoprene, dimethylbutadiene or divinylbenzene. Further processes may be suitable for the production of the modified propylene polymer, provided that the resulting modified propylene polymer meets the characteristics as defined in claim 1 regarding melt index and strain hardening behaviour.

The term copolymer as used above particularly refers to random propylene copolymers, propylene block copolymers, random propylene block copolymers and elastomeric polypropylenes, but is not restricted to these types of copolymers.

In the multilayer polyolefin foam pipes, the core pipe, being coated with the polyolefin foam, is either a plastic pipe, preferably a propylene polymer pipe, or a pipe consisting of metal, in particular steel, glass, ceramic or reinforced duroplastic material, or hollow conductor pipes.

According to an advantageous embodiment, the polyolefin foam layer, having a density of 150 to 850 kg/m$^3$, comprises mixtures of 5 to 50% by weight of compound A and of 50 to 95% by weight of compound B.

According to a further embodiment, the polyolefin foam layer comprises mixtures containing up to 3% by weight, based on the sum of the propylene polymers, of α-nucleating agents.

Examples of the modified propylene polymers of compound A, prepared by the treatment of unmodified polypropylenes with multifunctional, ethylenically unsaturated monomers in the presence of ionizing radiation or thermally decomposing free radical-forming agents are, in particular:

polypropylenes modified by the reaction of polypropylenes with bismaleimido compounds in the melt (EP-A-0 574 801 and EP-A-0 574 804)

polypropylenes modified by the treatment of polypropylenes with multifunctional, ethyle-nically unsaturated monomers under the action of ionizing radiation (EP-A-0 678 527), polypropylenes modified by the treatment of polypropylenes with multifunctional, ethylenically unsaturated monomers in the presence of peroxides in the melt (EP-A-0 688 817 and EP-A-0 450 342).

The modified propylene polymers contained in the polyolefine foam layer are preferably prepared by a) mixing a particulate unmodified propylene polymer, which comprises
   a1) propylene homopolymers, especially propylene homopolymers with a weight average molecular weight $M_w$ of 500,000 to 1,500,000 g/mol, and/or
   a2) copolymers of propylene and ethylene and/or α-olefins with 4 to 18 carbon atoms, or of mixtures of such copolymers, with from 0.05 to 3% by weight, based on the polyolefin composition used, of acyl peroxides, alkyl peroxides, hydroperoxides, peresters and/or peroxycarbonates as free-radical generators capable of thermal decomposition, if desired diluted with inert solvents, with heating to 30-100° C., preferably to 60-90° C., b) sorption of volatile bifunctional monomers by the particulate propylene polymer from the gas phase at a temperature T(° C.) of from 20 to 120° C., preferably of from 60° to 100° C., where the amount of the absorbed bifunctionally unsaturated monomers is from 0.01 to 10% by weight, preferably from 0.05 to 2% by weight, based on the propylene polymer used, and then c) heating and melting the particulate polyolefin composition in an atmosphere comprising inert gas and/or the volatile bifunctional monomers, from sorption temperature to 210° C., whereupon the free-radical generators capable of thermal decomposition are decomposed and then d) heating the melt up to 280° C. in order to remove unreacted monomers and decomposition products, e) agglomerating the melt in a manner known per se.

Usual amounts of auxiliary substances, which may range from 0.01 to 2.5% by weight of stabilizers, 0.01 to 1% by weight of processing aids, 0.1 to 1% by weight of antistats, 0.2 to 3% by weight of pigments and up to 3% by weight of α-nucleating agents, in each case based on the sum of the propylene polymers, may be added before step a) and/or e) of the method and/or before or during step c) and/or d) of the above described method.

The particulate unmodified propylene polymer may have the shape of powders, granules or grit with grain sizes ranging from 0.001 mm up to 7 mm.

The process for producing the modified propylene polymer preferably is a continuous method, performed in continuous reactors, mixers, kneaders and extruders. Batchwise production of the modified propylene polymer, however is feasible as well.

Practical sorption times τ of the volatile bifunctional monomers range from 10 to 1000 s, where sorption times τ of 60 to 600 are preferred.

The bifunctionally unsaturated monomers, which are used in the process for producing the modified propylene polymers preferably are $C_4$ to $C_{10}$ dienes and/or $C_7$ to $C_{10}$ divinyl compounds. Especially preferred are butadiene, isoprene, dimethyl-butadiene or divinylbenzene.

The polymers of compound B are selected from propylene homopolymers with a stereospecifity index >98% and/or copolymers from 91.0 to 99.9% by weight of propylene and 0.1 to 9.0% by weight of α-olefins with 2 or 4 to 18 carbon atoms with a stereospecifity index of the propylene homopolymer matrix of >96%. The stereospecifity index is measured and calculated as described in EP 0 277 514 A2 on page 5 (column 7, line 53 to column 8, line 11).

In general it is observed, that according to the invention it is advantageous to use compounds B with higher stiffness to obtain polyolefin pipes with increased compressive strength of the foamed layer.

It is therefore preferred, that the homopolymers of compound B have a stereospecifity index of >98,0% where a stereospecifity index of >98,5% is especially preferred. It is still more preferred for the homopolymers of compound B to have a stereospecifity index of >99,0%.

Comparably, when compound B comprises copolymers of propylene, either alone or mixed with propylene homopolymers, the following stereospecifity indices of the homopolymer matrix of the propylene copolymer are preferred: 96%<97%<98%<98,5%<99%, higher indices being more preferable.

According to an advantageous feature of the present invention the polymers of compound B, are obtained by polymerization with a Ziegler-Natta catalyst system comprising titanium-containing solid components, an organo-aluminum compound as cocatalyst and an external donor having the general formula

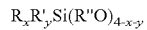

wherein R, R' and R" are identical or different and are linear or branched or cyclic aliphatic or aromatic hydrocarbon residues, and y and x independently from each other are 0 or 1, provided that x+y are 1 or 2. R, R' and R" may range from 1 to 20 carbon atoms.

Examples of propylene polymers with high stereoregularity obtained polymerization with a Ziegler-Natta catalyst system, preferably by gas phase polymerization, are propylene polymers as described in EP-A-0,790,262; WO 99/24,478 and WO 99/16,797.

A preferred external donor in the Ziegler-Natta catalyst system for producing the polymers of compound B is dicyclopentyldimethoxysilane.

For the copolymers of compound B it is preferred to have a comonomer content of 0.1-10% by weight, preferably of 1-8% by weight, where a comonomer content of 2-7% by weight is especially preferred.

For the copolymers of compound B it is preferred to use ethylene as comonomer. According to a preferred embodiment of the present invention the polyolefin foam layer comprises mixtures of 20 to 50% by weight of compound A with melt indices ranging from 0.3 to 4 g/10 min at 230° C./2, 16 kg and 50 to 80% by weight of compound B with, stereospecifity indices of the polypropylene matrix ranging from 97 to 99% and melt indices ranging from 0.1 to 2 g/10 min at 230° C./2, 16 kg, where compound B essentially is comprised of propylene block copolymers.

It is especially preferred in the aforementioned embodiment for the polymers of compound B to have a comonomer content of 3 to 8% by weight.

The auxiliary substances C) optionally contained in the singlelayer or multilayer polyolefin foam pipes may range from 0.01 to 2.5% by weight of stabilizers, 0.01 to 1% by weight of processing aids and, 0.1 to 1% by weight of antistats, 0.2 to 3% by weight of pigments and up to 3% by weight of a-nucleating agents and up to 20% by weight of fillers, in each case based on the sum of the propylene polymers.

The stabilizers preferably are mixtures of 0.01% to 0.6% by weight of phenolic antioxidants, 0.01% to 0.6% by weight of 3-arylbenzofuranones, 0.01% to 0.6% by weight of processing stabilizers based on phosphites, 0.01% to 0.6% by weight of high temperature stabilizers based on disulfides and thioethers and/or 0.01% to 0.8% by weight of sterically hindered amines (HALS).

Suitable phenolic antioxidants are 2-t-butyl-4,6-dimethylphenol, 2,6-di-t-butyl-4-methylphenol, 2,6-di-t-butyl-4-isoamylphenol, 2,6-di-t-butyl-4-ethylphenol, 2-t-butyl-4,6-diisopropylphenol, 2,6-dicyclopentyl-4-methylphenol, 2,6-di-t-butyl-4-methoxymethylphenol, 2-t-butyl-4,6-dioctadecylphenol, 2,5-di-t-butylhydroquinone, 2,6-di-t-butyl-4,4-hexadecyloxyphenol, 2,2'-methylene-bis(6-t-butyl-4-methylphenol), 4,4'-thio-bis-(6-t-butyl-2-methylphenol), octadecyl 3(3,5-di-t-butyl-4-hydroxyphenyl)propionate, 1,3,5-trimethyl-2,4,6-tris(3',5'-di-t-butyl-4-hydroxyben-zyl) benzene and/or pentaerythritol-tetrakis-3-(3,5-di-t-butyl-4-hydroxyphenyl)propionate.

As benzofuranone derivative, 5,7-di-t-butyl-3-(3,4-di-methylphenyl)-3H-benzofuran-2-one, in particular, is suitable.

As HALS compounds, bis-2,2,6,6-tetramethyl-4-piperidyl sebacate and/or poly-1,1,3,3-tetra-methylbutyl)-imino)-1,3,5-triazine-2,4-diyl)(2,2,6,6-tetramethylpiperidyl)-amino)-hexamethyle-ne-4-(2,2,6,6-tetramethyl)piperidyl)-imino) are particularly suitable.

The α-nucleating agents preferably are talcum, sorbitol and sorbitol derivatives, sodium benzoate or the sodium salt of methylene-bis-(2,4-di-t-butylphenol) phosphoric acid. Further nucleating agents, which are also suitable, are for example described in WO 99/24478.

The processing aids preferably are calcium stearate, magnesium stearate and/or waxes.

An advantageous embodiment of the present invention is a singlelayer pipe where the single layer is comprised of a polyolefin foam layer comprising mixtures of 20 to 80% by weight of compound A with melt indices ranging from 0.3 to 4 g/10 min at 230° C./2, 16 kg and 20 to 80% by weight of compound B with stereospecifity indices of the polypropylene matrix ranging from 98 to 99% and melt indices ranging from 0.1 to 2 g/10 min at 230° C./2, 16 kg, where the said foam layer has a density of 100 to 850 kg/m$^3$.

Preferably the densities of the polyolefin foam layer of a single layer pipe may range from 150 to 700 kg/m$^3$, where densities of from 250 to 400 kg/m$^3$ are especially preferred.

A further advantageous embodiment of the present invention is a multilayer pipe, where the polyolefin foam multilayer pipe is a polyolefin coated steel pipe with an inner steel layer, an intermediate polyolefin foam layer and an outer unfoamed polymer layer.

According to a preferred embodiment of the present invention the polyolefin foam layer has a density of 400-850 kg/m$^3$, preferably of 500-850 kg/m$^3$, where a density of 550-800 kg/m$^3$ is especially preferred.

For a good interlaminar adhesion between the steel pipe and the foamed polyolefin layer it is advantageous to use epoxy resin coated steel pipes and to applicate a compatibilizing layer between the epoxy resin coated steel pipe and the foamed polyolefin layer, whereby the compatibilizing layer consists of propylene copolymers or propylene polymer graft copoly-mers both with chemical bound ethylenically unsaturated carbonic acids and/or carbonic acid anhydrides, particularly acrylic acid, methacrylic acid and/or maleic anhydride.

A still further embodiment of the present invention is a two-layer polyolefin foam pipe, wherein the first layer comprises an unfoamed propylene polymer and the second layer comprises the polyolefin foam layer.

Pipes where the foamed layer is the outer layer and the unfoamed layer is the inner layer as well as pipes where the unfoamed layer is the outer layer and the foamed layer is the inner layer are included in the above embodiment.

A still further advantageous embodiment of the present invention is a multilayer polyolefin foam pipe which is comprised of an inner unfoamed polypropylene layer, an intermediate polyolefin foam layer and an outer unfoamed polypropylene layer.

In the inventive multilayer polyolefin foam pipes, the unfoamed propylene polymer layer may comprise a wide range of polymers, e.g. rubber modified polypropylenes, filled polypropylenes, polyethylenes, copolymers, etc.

The invention is not restricted to the aforementioned examples.

A further object of the invention is a process for producing polyolefin foam coated steel pipes with improved compression resistance, comprising a steel pipe core, an intermediate polyolefin foam layer and an unfoamed outer polymer layer, by coating extruder/rotating steel pipe technology or by crosshead die pipe coating technology, where the polyolefin foam layer has a density of from 400 to 850 kg/m$^3$ and the polyolefins used in foam coating are mixtures of A) 5 to 80% by weight of a compound A, which is selected from modified propylene polymers with a melt index of 0.05 to 10 g/10 min at 230° C./2.16 kg, preferably of 0.2 to 10 g/10 min at 230° C./2.16 kg, which modified propylene polymers have strain hardening elongational viscosity, and mixtures of these modified propylene polymers, B) 20 to 95% by weight of a compound B which is selected from propylene homopolymers with a stereospecifity index >98% and a melt index of 0.05 to 10 g/10 min at 230° C./2.16 kg, preferably of 0.1 to 10 g/10 min at 230° C./2.16 kg and copolymers from 80.0 to 99.9% by weight of propylene and 0.1 to 20.0% by weight of ethylene or α-olefins with 4 to 18 carbon atoms with a stereospecifity index of the propylene homopolymer matrix of >96% and a melt index of 0.1 to 10 g/10 min at 230° C./2.16 kg, and mixtures of these propylene homopolymeres and/or copolymers, and, C) optionally, usual amounts of stabilizers and/or processing aids and/or antistats and/or pigments and/or nucleating agents and/or fillers as auxiliary substances, whereby the melt of said mixtures in the foam coating steel pipe process contains up to 12% by weight, based on the polyolefin mixture, of chemical blowing agents that split off gas, or hydrocarbons, halogenated hydrocarbons and/or gases as blowing agents and whereby the steel pipes are preheated to a temperature preferably ranging from 170 to 230° C. and the foam coating extruder has a temperature profile preferably ranging from 175 to 250° C.

In producing the polyolefin foam coated steel pipes by coating extruder/rotating steel pipe technology, the preheated steel pipe which is optionally coated with an epoxy resin, is kept under rotation and is successively melt coated by independent coating extruders having flat film dies with layers of the compatibilizing agent, the foaming propylene polymer mixture and the unfoamed polymer cover layer.

In producing the polyolefin foam coated steel pipes by crosshead die pipe coating technology, it is preferred to use a crosshead fed by two extruders, one for the polyolefin foam layer and the second for the outer unfoamed polymer layer. The steel pipe is pretreated by optionally coating it with an epoxy resin layer, an adhesive layer and finally a solid layer. Preferably the steel pipe is preheated to a temperature ranging from 170 to 240° C. before it enters the crosshead. The temperature profile on the crosshead is 175 to 250° C. The foamed melt is brought first on the pretreated pipe, followed by the unfoamed outer polymer layer, subsequently the coated pipe is calibrated in the calibrating sleeve and cooled. Preferred are steel pipe diameters ranging from 50 to 500 mm with coated polyolefin foam layer thickness up to 200 mm.

The blowing agents, used in the process for producing singlelayer and multilayer polyolefin foam pipes, are chemical blowing agents that split off gas, or hydrocarbons, halogenated hydrocarbons and/or gases. Examples of suitable chemical blowing agents, that emit a gas, are sodium hydrogencarbonate, azodicarbonamide and/or cyanuric trihydrazide. Suitable hydrocarbons as blowing agents are readily volatile hydrocarbons, such as pentane, isopen-tane, propane and/or isobutane. Examples of suitable halogenated hydrocarbons are mono-fluorotrichloromethane and/or difluoromonochloromethane. Suitable gases as blowing agents are nitrogen, argon and/or carbon dioxide A still further object of the present invention is a process for producing polyolefin foam plastic pipes with improved compression resistance by coextrusion or injection molding or blow molding, where at least one layer is comprised of a polyolefin foam layer, where the polyolefin foam layer has a density of from 50 to 850 kg/m$^3$ and the polyolefins used for the foamed polyolefin layer are mixtures of A) 5 to 80% by weight of a compound A, which is selected from modified propylene polymers with a melt index of 0.05 to 10 g/10 min at 230° C./2.16 kg, preferably of 0.2 to 10 g/10 min at 230° C./2.16 kg, which modified propylene polymers have strain hardening behaviour, and mixtures of these modified propylene polymers, B) 20 to 95% by weight of a compound B which is selected from propylene homopolymers with a stereospecifity index >98% and a melt index of 0.05 to 10 g/10 min at 230° C./2.16 kg, preferably of 0.1 to 10 g/10 min at 230° C./2.16 kg and copolymers from 80.0 to 99.9% by weight of propylene and 0.1 to 20.0% by weight of ethylene or α-olefins with 4 to 18 carbon atoms with a stereospecifity index of the propylene homopolymer matrix of >96% and a melt index of 0.1 to 10 g/10 min at 230° C./2.16 kg, and mixtures of these propylene homopolymeres and/or copolymers, and, C) optionally, usual amounts of stabilizers and/or processing aids and/or antistats and/or pigments and/or nucleating agents and/or fillers as auxiliary substances, whereby the melt of said mixtures in the coextrusion or injection molding blow molding foam process contains up to 12% by weight, based on the polyolefin mixture, of chemical blowing agents that split off gas, or hydrocarbons, halogenated hydrocarbons and/or gases as blowing agents.

In the process for producing the polyolefin foam multilayer plastic pipes, the continuous kneaders for producing the foamed polyolefin layer from the polyolefin mixture containing blowing agents can be single screw extruders with an L/D of 20 to 40 or twin screw extruders or extruder cascades of homogenizing extruders (single screw or twin screw) and foaming extruders. Optionally, a melt pump and/or a static mixer can be used additionally between the extruder and the ring die head. Ring shaped dies with diameters ranging from 20 to 800 mm are possible. Advantageous die temperatures for discharging the melt, which contains the blowing agent, are 160 to 240° C. After leaving the ring-shaped die, the polyolefin foam multilayer plastic pipes taken off over a calibrating mandrel, usually accompanied by cooling of the pipe by air cooling and/or water cooling, optionally also with inner water cooling.

According to an embodiment of the present invention the polyolefin foam plastic pipes are cut open before collapsing and the resulting multilayer polyolefin foam sheets are optionally wound up.

This method is e.g. described by Djordjevic, D., Rapra Review Report 6(1992)2, 51-53.

Preferred applications of the polyolefin foam singlelayer or multilayer pipes with improved compression resistance are: as coated steel pipes for transporting crude oil or gas products or for district heating applications, as singlelayer pipes for insulation purposes and for non- or low-pressure applications and as multilayer plastic pipes for the transportation of hot or cold fluids.

In the application as coated steel pipes for the transport of crude oil from sea bottom to tankers, foam densities of the foamed layer ranging from 550 to 850 kg/m$^3$ are preferred. In order to be able to pump crude oil coming from deposits in cold sea regions, the fluid has to be held sufficiently warm. By utilising the inventive foamed polypropylene based insulation layer, it is possible to avoid extensive heat losses to the surrounding water and also to eliminate costly additional oil heating units along the pipe line. However, at water depths of 200 to 300 m (up to 600 m with existing materials) pressures are substantial and high mechanical stability of the foamed insulation layer is required. The inventive foam layers do have an outstanding balance between heat insulation efficiency and compression strength.

Steel pipes coated with foam layers according ot the invention (e.g. according to example 3) can withstand pressures corresponding to water depths of more than 2000 m with foam densities of the foamed layer ranging from 550 to 850 kg/m$^3$. With varying compositions, i.e. different A/B ratios, even greater compression resistances (corresponding to water depths down to 3000 m) can be achieved.

It is therefore possible to use pipes according to the invention at still greater water depths than today with foam densities of the foamed layer ranging from 550 to 850 kg/m$^3$. These pipes have a comparable heat insulation capability compared with currently used pipes. Pipes with lower densities of the foamed layer can be used at current depths (down to 600 m). These pipes have the advantage of a better heat insulation capability.

In the application as polyolefin foam multilayer plastic pipes for the transportation of hot and cold fluids the inventive pipes can be preferably used for transporting and conveying of hot and/or cold water in indoor applications.

The special advantage of the inventive singlelayer or multilayer pipes lies therein, that on the basis of the inventive propylene polymer mixtures for the foam layers, singlelayer or multi-layer pipes can be produced which have in the polyolefin foam layer a uniform foam cell distribution and a high strength of the foam layer and therefore an outstanding balance between heat insulation efficiency and compression resistance.

EXAMPLES

The following tests were made:

Tensile modulus according to ISO 527 (cross head speed 1 mm/min)

Charpy notched impact strength according to ISO 179/1eA

Compressive strength according to ASTM D 695-96 (5% compression)

Example 1

1.1 Synthesis of the Modified Propylene Polymer A)

A powdery polypropylene homopolymer, with a melt index of 0.25 g/10 min at 230° C./2.16 kg and an average particle size of 0.45 mm, is metered continuously into a continuous paddle mixer under inert atmosphere (Nitrogen). Furthermore, 0.65% by weight of tert-butylperoxy isopropyl carbonate and 0.15% by weight of butadiene, in each case based on the propylene homopolymer are metered continuously into the mixer. While being mixed homogeneously at 60° C., the propylene homopolymer, charged with the thermally decomposing free radical-forming agent and auxiliary material, is charged absorptively during a residence time of 10 minutes. After transfer to a twin screw extruder, the charged polypropylene powder is melted at a mass temperature of 230° C. and after passing of a degassing zone a powdery mixture of 0.1% by weight of pentaerythrityl-tetrakis(3-(3',5'-di-tert-butyl-4-hydroxyphenyl)-propionate, 0.1% by weight of tris-(2,4,-di-tert-butylphenyl)phosphit, 0.1% by weight of calcium stearate and 0.05% by weight of hydrotalcit is added to the melt and homogenized. Then the pelletization of the melt follows.

The resulting, modified propylene polymer A) has a melt index of 2.3 g/10 min at 230° C./2.16 kg and shows strain hardening behaviour as characterised by the Rheotens values of $F_{max}$=33 cN and $v_{max}$=210 mm/s measured at failure of the strand.

1.2 Preparation of the Polyolefin Mixture

A mixture of of 30% by weight of modified propylene polymer A) which has a melt index of 2.3 g/10 min at 230° C./2,16 kg and Rheotens values of Fmax=33 cN and v max=210 mm/s measured at failure of the strand and 70% by weight of a propylen block copolymer B) having an ethylene content of 5,0% by weight, a stereospecifity index of 98,7% and a melt index of 0.30 g/10 min at 230° C./2,16 kg and which mixture contains 0.25% by weight of pentaerythrityl-tetrakis(3-(3',5'-di-tert-butyl -4-hydroxyphenyl)-propionate, 0.15% by weight of tris-(2,4,-di-tert-butylphenyl)phosphit, 0.2% by weight of di-stearyl-thio-di-propionate and 0.7% by weight of calcium stearate is melted and homogenized in a Werner & Pfleiderer ZSK 92 twin screw extruder with a temperature profile of 175 to 250° C., discharged and granulated. The resulting propylene compound has a melt index of 0.38 g/10 min., a tensile modulus of 1740 MPa and a notched Charpy impact strength at −20° C. of 2,5 kJ/m².

1.3 Preparation of the Polyolefin Foam coated Steel Pipe

The pilot steel pipe coating line consists of a preheating unit, two extruders, two die heads and the cooling unit. The line is designed so that the adhesive layer is added first and then the foamed layer before the cooling starts.

A steel pipe (Ø150 mm) coated with a 25 μm epoxy resin layer and 30 μm compatibilizing layer of maleic anhydride grafted propylene polymer (0.20% by weight of maleic anhydric), being preheated to a temperature of 190° C., is driven forward with a speed of 1.2 m/min.

The stabilised polypropylene mixture of the modified polypropylene A) and the propylene block copolymer B) as described in 1.2 is dry blended with 2.2% by weight, based on the propylene compound, with a mixture of blowing agent based on bicarbonate and citric acid. The resulting mixture is supplied by means of a metering system to the feeding funnel of the extruder with a temperature profile of 175 to 250° C.

Initially, the mixture is melted and homogenised and subsequently the split off blowing gas is mixed intensively in the extruder and distributed homogeneously.

After that, the melt is transferred through the flat die head and added onto the steel pipe, the coated pipe is then cooled by water.

From the polyolefin foam coated steel pipe test specimens of a length of 254 mm are machine cutted. The polyolefin foam layer has a thickness of 50 mm and a density of 720 kg/m³. The unfoamed cover layer has a thickness of 8 mm.

Example 2

2.1 Synthesis of the Modified Propylene Polymer A)

A powdery random propylene copolymer containing 6% by weight of ethylene with a melt index of 0.23 g/10 min at 230° C./2,16 kg and an average particle size of 0.45 mm, is metered continuously into a continuous paddle mixer under inert nitrogen atmosphere. Furthermore, 0.23% by weight of tert-butylperoxy benzoate and 0.33% by weight of divinylbenzene, in each case based on the propylene polymer are dosed continuously into the mixer. While being mixed homogeneously at 70° C., the powdery propylene homopolymer is charged absorptively with these substances during a residence time of 20 minutes. After transfer to a twin screw extruder, the charged polypropylene powder is melted at a mass temperature of 230° C. and after passing a degassing zone a powdery mixture of 0.1% by weight of pentaerythrityl-tetrakis(3-(3',5'-di-tert-butyl-4-hydroxyphenyl)-propionate, 0.1% by weight of tris-(2,4,-di-tert-butylphenyl)phosphit and 0.1% by weight of calcium stearate is added to the melt and homogenized. Then the pelletization of the melt follows.

The resulting, modified propylene polymer A) has a melt index of 0.52 g/10 min at 230° C./2,16 kg and shows strain-hardening behaviour characterised by the Rheotens values of $F_{max}$=38,2 cN and $v_{max}$=192 mm/s measured at failure of the strand.

2.2 Preparation of the Polyolefin Mixture

A mixture of of 40% by weight of modified propylene polymer A) which has the melt index of 0.52 g/10 min at 230° C./2,16 kg and the Rheotens values of $F_{max}$=38,2 cN and $v_{max}$=192 mm/s measured at failure of the strand and 60% by weight of a propylen block copolymer B) having an ethylene content of 5.0% by weight, a stereospecifity index of the polypropylene matrix of 98,7% and a melt index of 0.30 g/10 min at 230° C./2.16 kg and contains 0.25% by weight of pentaerythrityl-tetrakis(3-(3',5'-di-tert-butyl-4-hydroxyphenyl)-propionate, 0.15% by weight of tris-(2,4,-di-tert-butylphenyl)phosphit, 0.2% by weight of di-stearyl-thio-di-propionate and 0.7% by weight calcium stearate is melted and homogenized in a Werner & Pfleiderer ZSK 92 twin screw extruder with a temperature profile of 175 to 250° C., discharged and granulated. The resulting propylene compound has a melt index of 0.35 g/10 min.

2.3 Preparation of the multilayer Polyolefin Foam Pipe

Three layer polyolefin foam pipes having an outer diameter of 200 mm were extruded by a conventional pipe extruder having a screw diameter of 60 mm and 2 conventional side extruders having screw diameters of 50 mm, all connected to a multilayer tool for extruding 3 layers of varying thickness of the materials and composition of the layers. The line speed was 0.9 m/min, the mass temperature of the polyolefin mixture containing foaming agent was 190° C. and of the nonfoamed propylene polymer 210° C.

Both 50 mm extruders producing the nonfoamed inner and outer layer of the multilayer polyolefin foam pipe were fed with a polypropylene homopolymer with a melt index of 0.3 g/10 min at 230° C./2.16 kg. The 60 mm extruder (L/D 35, temperature profile 175-230° C.) was fed with the polyolefin mixture as described in 2.2 from a modified propylene copolymer and a propylene block copolymer, being dry blended with 3.0% by weight, based on the sum of the polyolefins, of a blowing agent mixture, based on bicarbonate and citric acid. Initially, the mixture is melted and homogenized and subsequently the split off blowing gas is mixed intensively in the extruder and distributed homogeneously in the melt. After that, the melt is transferred through the multilayer ring die tool and the multilayer pipe is cooled by a water cooling device.

The resulting three layer polyolefin foam pipe has an outer diameter of 200 mm, the thickness of the outer layer being 1 mm, the thickness of the foamed intermediate polyolefin layer being 6 mm, whereby the foam layer, having a fine celled, closed-cell foam structure, has a density of 365 kg/m$^3$, and the thickness of the nonfoamed inner layer being 2 mm.

Example 3

Polyolefin foam layers comprising mixtures of

30% by weight of compound A, which is a propylene homopolymer with a melt index of 2.3 g/10 min at 230° C./2.16 kg and a strain hardening behaviour expressed in Rheotens values $F_{max}$=33 cN and $v_{max}$=210 mm/s and 70% by weight of compound B,) which is a propylene block copolymer containing 5.2% by weight of ethylene, having a melt index of 0.25 g/10 min at 230° C./2.16 kg and with a stereospecifity of the propylene homopolymer matrix of 98.7% were foamed to polyolefin foam layer samples of different density.

Compound B and a reference polymer (ethylene content=8.0% by weight, melt index=0.27 g/10 min at 230° C./2.16 kg, stereospecifity=97.4%) were also foamed to polyolefin foam layer samples.

Thermal Conductivity was determined according to ASTM C-518 and Compression strength at 5% compression of the samples was determined according to ASTM D 695-96.

The following results were obtained:

| Product | Density [kg/m$^3$] | Tensile Modulus [MPa] | K-Value [W/mK] | Compressive strength [MPa] |
|---|---|---|---|---|
| reference | 737 | 900 | 0.18 | 12.6 |
| reference | 820 | 950 | 0.20 | 17 |
| 100% B | 734 | 1000 | — | 14 |
| 100% B | 643 | 830 | 0.16 | 11 |
| 30% A + 70% B | 727 | 1200 | 0.177 | 22 |
| 30% A + 70% B | 759 | 1270 | 0.184 | 23 |
| 30% A + 70% B | 653 | 950 | 0.161 | 17 |
| 30% A + 70% B | 699 | 1040 | 0.168 | 19 |
| 30% A + 70% B | 616 | 730 | 0.149 | 15 |

The invention claimed is:

1. A process for producing polyolefin foam coated steel pipes with improved compression resistance, comprising a steel pipe core, an intermediate polyolefin foam layer and an unfoamed outer polymer layer, comprising coating by extruder/rotating steel pipe processing or crosshead die pipe coating processing, the polyolefin foam layer having a density of from 400 to 850 kg/m$^3$ and the polyolefins for the polyolefin foam coating being mixtures of
   A) 5 to 80% by weight of a compound A, which is selected from the group consisting of modified propylene polymers with a melt index of 0.05 to 10 g/10 min at 230° C./2.16 kg, said modified propylene polymers having strain hardening behaviour, and mixtures of said modified propylene ploymers; and
   B) 20 to 95% by weight of a compound B which is selected from the group consisting of propylene homopolymers with a stereospecifity index >98% and a melt index of 0.05 to 10 g/10 min at 230° C./2.16 kg, copolymers from 80.0 to 99.9% by weight of propylene and 0.1 to 20.0% by weight of ethylene or α-olefins with 4 to 18 carbon atoms, with a stereospecifity index of the propylene homopolymer matrix of >96% and a melt index of 0.1 to 10 g/10 min at 230° C./2.16 kg, and mixtures of said propylene homopolymers and/or copolymers, wherein the melt of said mixtures in the foam coating steel pipe process contains up to 12% by weight, based on the polyolefin mixture, of chemical blowing agents that split off gas, or hydrocarbons, halogenated hydrocarbons and/or gases as blowing agents and the steel pipes are preheated to a temperature ranging from 170 to 230° C. and the coating extruder has a temperature profile ranging from 175 to 250° C.

2. A process for producing polyolefin foam plastic pipes with improved compression resistance comprising coextrusion or injection molding or blow molding, wherein at least one layer is comprised of a polyolefin foam layer, wherein the polyolefin foam layer has a density of from 50 to 850 kg/m$^3$ and the polyolefins of the foamed polyolefin layer are mixtures of
   A) 5 to 80% by weight of a compound A, which is selected from the group consisting of modified propylene polymers with a melt index of 0.05 to 10 g/10 min at 230° C./2.16 kg, said modified propylene polymers having strain hardening behaviour, and mixtures of these modified propylene polymers; and
   B) 20 to 95% by weight of a compound B which is selected from the group consisting of propylene homopolymers with a stereospecifity index >98% and a melt index of 0.05 to 10 g/10 min at 230° C./2.16 kg, copolymers from 80.0 to 99.9% by weight of propylene and 0.1 to 20.0% by weight of ethylene or α-olefins with 4 to 18 carbon atoms with a stereospecifity index of the propylene homopolymer matrix of >96% and a melt index of 0.1 to 10 g /10 min at 230° C./2.16 kg, and mixtures of said propylene homopolymers and/or copolymers, wherein the melt of said mixtures in the coextrusion or injection molding or blow molding foam process contains up to 12% by weight, based on the polyolefin mixture, of chemical blowing agents that split off gas, or hydrocarbons, halogenated hydrocarbons and/or gases as blowing agents.

3. A process according to claim 2, further comprising cutting open the polyolefin foam pipes and collapsing to produce multilayer polyolefin foam sheets.

4. A process according to claim 1, wherein
compound A is selected from the group consisting of modified propylene polymers with a melt index of 0.2 to 10 g/10 min at 230° C./2.16 kg, said modified propylene polymers having strain hardening behaviour, and mixtures of said modified propylene polymers; and
compound B is selected from the group consisting of propylene homopolymers with a stereospecifity index >98% and a melt index of 0.1 to 10 g/10 min at 230° C./2.16 kg, copolymers from 80.0 to 99.9% by weight of propylene and 0.1 to 20.0% by weight of ethylene or α-olefins with 4 to 18 carbon atoms, with a stereospecificity index of the propylene homopolymer matrix of >96% and a melt index of 0.1 to 10 g/10 min at 230° C./2.16 kg, and mixtures of said propylene homopolymers and/or copolymers.

5. A process according to claim 2, wherein
compound A is selected from the group consisting of modified propylene polymers with a melt index of 0.2 to 10 g/10 min at 230° C./2.16 kg, said modified propylene polymers having strain hardening behaviour, and mixtures of these modified propylene polymers, and
compound B is selected from the group consisting of propylene homopolymers with a stereospecificity index >98% and a melt index of 0.1 to 10 g/10 min at 230° C./2.16 kg, copolymers from 80.0 to 99.9% by weight of propylene and 0.1 to 20.0% by weight of ethylene or α-olefins with 4 to 18 carbon atoms with a stereospecifity index of the propylene homopolymer matrix of >96% and a melt index of 0.1 to 10 g/10 min at 230° C./2.16 kg, and mixtures of said propylene homopolymers and/or copolymers.

6. A process according to claim 1, wherein the polyolefin foam layer has a density of 150 to 850 kg/m$^3$ and comprises mixtures of 5 to 50% by weight of compound A and 50 to 95% by weight of compound B.

7. A process according to claim 2, wherein the polyolefin foam layer has a density of 150 to 850 kg/m$^3$ and comprises mixtures of 5 to 50% by weight of compound A and 50 to 95% by weight of compound B.

8. A process according to claim 1, wherein the polyolefin foam layer comprises up to 3% by weight, based on the sum of the propylene polymers, of α-nucleating agents.

9. A process according to claim 2, wherein the polyolefin foam layer comprises up to 3% by weight, based on the sum of the propylene polymers, of α-nucleating agents.

10. A process according to claim 1, wherein the modified propylene polymers A), are prepared by
a) mixing a particulate unmodified propylene polymer, which comprises
a1) propylene homopolymers and/or
a2) copolymers of propylene and ethylene and/or α-olefins with 4 to 18 carbon atoms, or mixtures of such copolymers, with from 0.05 to 3% by weight, based on the polyolefin composition used, of acyl peroxides, alkyl peroxides, hydroperoxides, peresters and/or peroxycarbonates as free-radical generators capable of thermal decomposition with heating to 30-100° C.,
b) sorption of volatile bifunctional monomers by the particulate propylene polymer from the gas phase at a temperature T(° C.) of from 20 to 120° C. where the amount of the absorbed bifunctionally unsaturated monomers is from 0.01 to 10% by weight based on the propylene polymer used, and then
c) heating and melting the particulate polyolefin composition in an atmosphere comprising inert gas and/or the volatile bifunctional monomers, from sorption temperature to 210° C., whereupon the free-radical generators capable of thermal decomposition are decomposed and then
d) heating the melt up to 280° C. in order to remove unreacted monomers and decomposition products, and
e) agglomerating the melt.

11. A process according to claim 2, wherein the modified propylene polymers A), are prepared by
a) mixing a particulate unmodified propylene polymer, which comprises
a1) propylene homopolymers and/or
a2) copolymers of propylene and ethylene and/or α-olefins with 4 to 18 carbon atoms, or mixtures of such copolymers, with from 0.05 to 3% by weight, based on the polyolefin composition used, of acyl peroxides, alkyl peroxides, hydroperoxides, peresters and/or peroxycarbonates as free-radical generators capable of thermal decomposition with heating to 30-100° C.,
b) sorption of volatile bifunctional monomers by the particulate propylene polymer from the gas phase at a temperature T(° C.) of from 20 to 120° C. where the amount of the absorbed bifunctionally unsaturated monomers is from 0.01 to 10% by weight based on the propylene polymer used, and then
c) heating and melting the particulate polyolefin composition in an atmosphere comprising inert gas and/or the volatile bifunctional monomers, from sorption temperature to 210° C., whereupon the free-radical generators capable of thermal decomposition are decomposed and then
d) heating the melt up to 280° C. in order to remove unreacted monomers and decomposition products, and
e) agglomerating the melt.

12. A process according to claim 1, wherein the polymers of compound B are obtained by polymerization with a Ziegler-Natta catalyst system comprising titanium-containing solid components, an organo-aluminum compound as cocatalyst and an external donor according to the formula

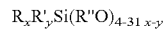

wherein R, R' and R" are identical or different and are linear or branched or cyclic aliphatic or aromatic hydrocarbon residues, and y and x independently from each other are 0 or 1, provided that x+y are 1 or 2.

13. A process according to claim 2, wherein the polymers of compound B are obtained by polymerization with a Ziegler-Natta catalyst system comprising titanium-containing solid components, an organo-aluminum compound as cocatalyst and an external donor according to the formula

wherein R, R' and R" are identical or different and are linear or branched or cyclic aliphatic or aromatic hydrocarbon residues, and y and x independently from each other are 0 or 1, provided that x+y are 1 or 2.

14. A process according to claim 12, wherein the external donor is dicyclopentyldimethoxysilane.

15. A process according to claim 13, wherein the external donor is dicyclopentyldimethoxysilane.

16. A process according to claim 1, wherein the polyolefin foam layer comprises mixtures of 20 to 50% by weight of compound A with melt indices ranging from 0.3 to 4 g/10 min at 230° C./2.16 kg and 50 to 80% by weight of compound B with stereospecifity indices ranging from 97 to 99% and melt indices ranging from 0.1 to 2 g/10 min at 230° C./2.16 kg, where compound B essentially is comprised of propylene block copolymers.

17. A processes according to claim 2, wherein the polyolefin foam layer comprises mixtures of 20 to 50% by weight of compound A with melt indices ranging from 0.3 to 4 g/10 min at 230° C./2.16 kg and 50 to 80% by weight of compound B with stereospecifity indices ranging from 97 to 99% and melt indices ranging from 0.1 to 2 g/10 min at 230° C./2.16 kg, where compound B essentially is comprised of propylene block copolymers.

* * * * *